United States Patent [19]

Dochterman

[11] 4,323,217

[45] Apr. 6, 1982

[54] MOTOR MOUNTING ASSEMBLY INCLUDING EXTENDABLE BAND

[75] Inventor: Richard W. Dochterman, Fort Wayne, Ind.

[73] Assignee: General Electric Company, Fort Wayne, Ind.

[21] Appl. No.: 125,037

[22] Filed: Feb. 27, 1980

Related U.S. Application Data

[63] Continuation of Ser. No. 116,745, Jan. 30, 1980.

[51] Int. Cl.³ .............................................. F16F 15/04
[52] U.S. Cl. .................................... 248/604; 248/670
[58] Field of Search ................. 248/27.1, 231, 316 R, 248/603, 604, 670

[56] References Cited

U.S. PATENT DOCUMENTS

| | | | |
|---|---|---|---|
| 519,312 | 5/1894 | Arthur | 248/231 X |
| 1,262,413 | 4/1918 | Tyler | 248/231 X |
| 1,653,083 | 12/1927 | Blaw | 248/231 X |
| 2,081,030 | 5/1937 | Anderson . | |
| 2,096,621 | 10/1937 | Skolfield . | |
| 2,610,816 | 9/1952 | Vote | 248/27.1 |
| 2,615,620 | 10/1952 | Goettl . | |
| 2,706,023 | 4/1955 | Merritt | 248/231 X |
| 2,731,193 | 1/1956 | Lall . | |
| 2,976,352 | 3/1961 | Atalla . | |
| 2,977,043 | 3/1961 | Scheldorf . | |
| 3,059,250 | 10/1962 | Mayer . | |
| 3,145,910 | 10/1964 | Jolly . | |
| 3,317,124 | 5/1967 | Morrill . | |
| 3,584,469 | 6/1971 | Butts . | |
| 3,746,894 | 7/1973 | Dochterman . | |
| 3,790,114 | 2/1974 | Italiano . | |
| 3,830,595 | 8/1974 | Carpenter . | |
| 4,019,704 | 4/1977 | Levine . | |
| 4,063,060 | 12/1977 | Litch . | |
| 4,076,197 | 2/1978 | Dochterman . | |

FOREIGN PATENT DOCUMENTS 1135085  8/1962  Fed. Rep. of Germany .

Primary Examiner—William H. Schultz
Attorney, Agent, or Firm—Ralph E. Krisher, Jr.

[57] ABSTRACT

An assembly includes a band which is adapted to encircle and tightly clamp motor housings of different sizes, and mounting arms located on the band extend radially outwardly. The arms are adapted for connection to a mounting surface and provide isolation of torsional motor vibrations. Each arm includes a slot to receive the band, and an end clamped between the band and motor housing. The band has openings that receive and locate tabs on the arm ends. A band extension enables enlargement of the band to accommodate a larger motor. The band openings are arranged in sets to permit predetermined angular spacing of the arms for different band circumferences. Thus, depending on the dimensions of the arms, a single band and arm kit may be used to mount motors of two different diameters in a given blower installation with proper angular alignment of the mounting arms and blower housing bolt holes.

11 Claims, 9 Drawing Figures

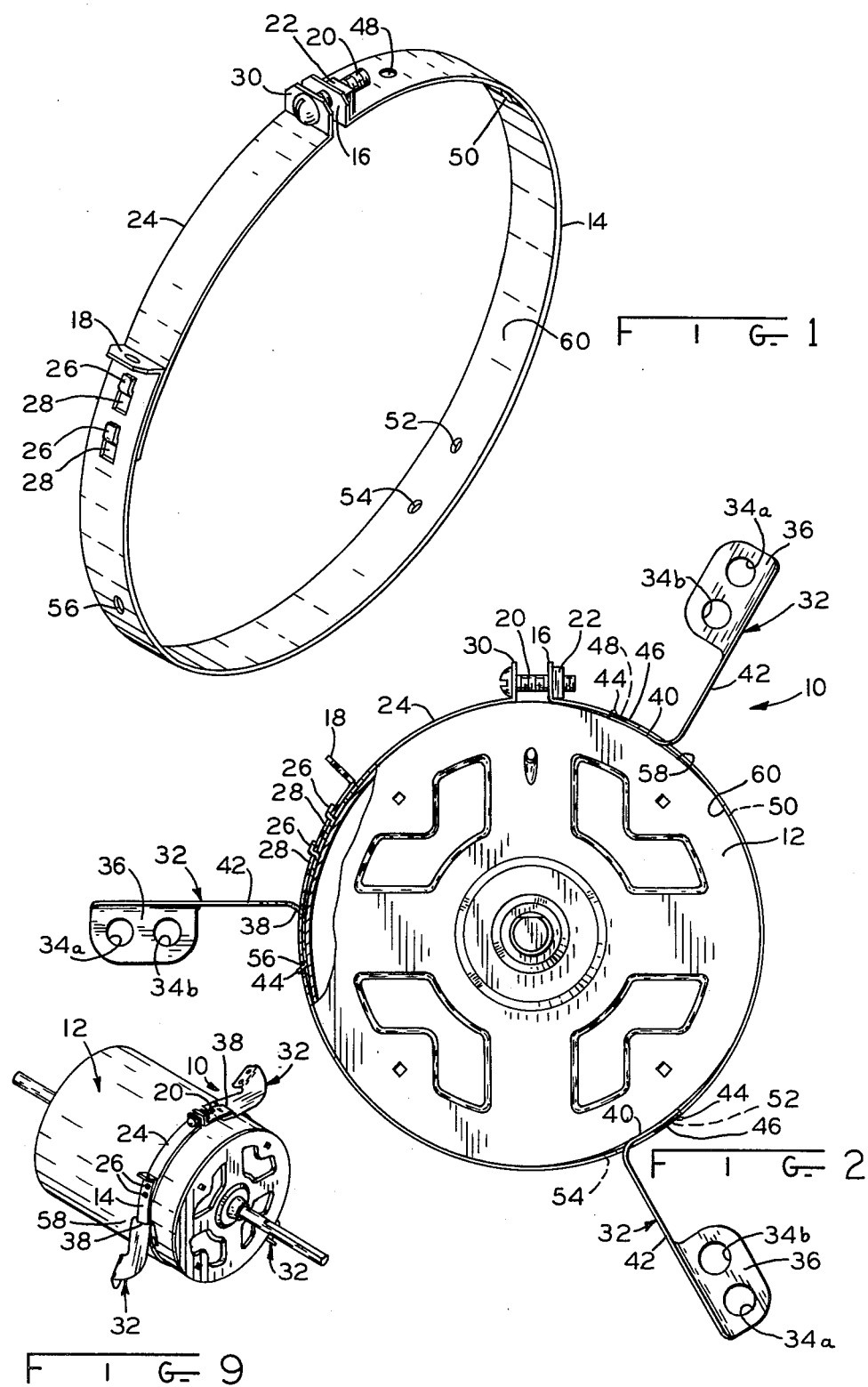

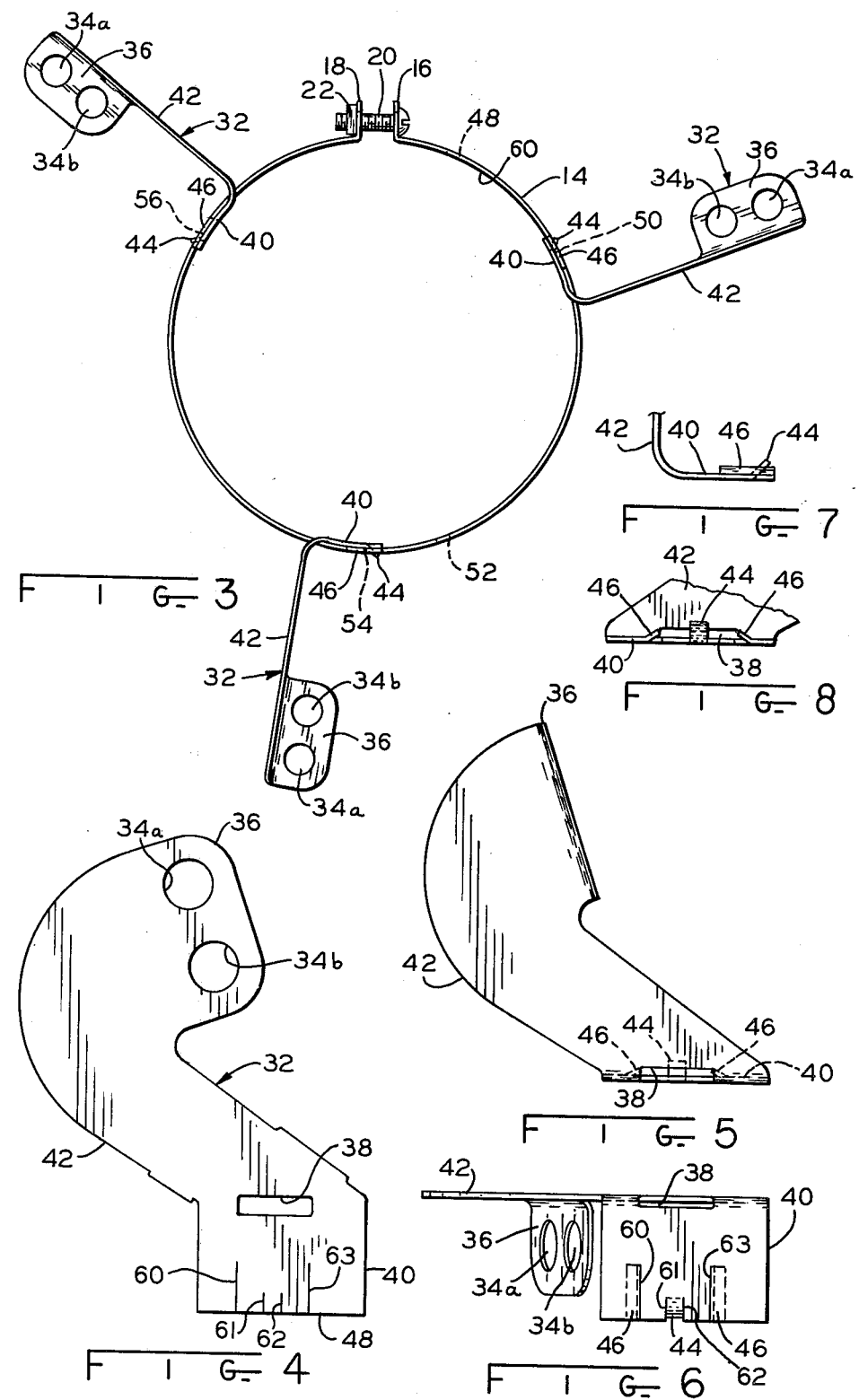

MOTOR MOUNTING ASSEMBLY INCLUDING EXTENDABLE BAND

CROSS REFERENCE TO RELATED APPLICATIONS

The subject matter of this application is related to the subject matter of my pending application Ser. No. 840,263 filed on Oct. 7, 1977, now abandoned; and to my continuation application based thereon having Ser. No. 116,745 filed on January 30, 1980. This present application is a continuation in part of said application Serial No. 116,745. Now pending Litch applications Ser. No. 829,666 filed September 1, 1977, and Serial No. 26,130 filed Apr. 2, 1979, (both of which are assigned to the assignee of this application) also contain subject matter to which this application is related. The entire disclosures of all of the just mentioned applications are hereby incorporated by reference.

BACKGROUND OF THE INVENTION

The present invention relates generally to motor mounting arrangements for mounting an electric motor to a supporting structure, such as a blower housing, and in particular to mounting bands which are adjustable so as to accommodate motors of various diameters.

In air moving systems incorporating blowers, the blower wheels are supported within blower housings which are typically dimensioned and positioned such that relatively close running tolerances are maintained in the interest of maximizing blower efficiency. In direct drive applications, the motor is suspended from the blower housing scroll, and a motor shaft in turn supports and drives the blower wheel within the housing. This type of direct drive arrangement is very desirable because of its relative simplicity and economy as compared with belt and pulley arrangements, and the like. Examples of products wherein mounting arrangements of this type are utilized include furnaces, and could also include room air conditioners, etc.

In applications wherein a blower wheel is mounted directly to a motor shaft, it is very desirable to isolate motor vibrations from the housing structure so as to minimize the transmission of noise thereby achieving quieter operation. Not only must mounting arrangements reduce the transmission of motor vibrations, but they must provide sufficient mounting rigidity to avoid excessive axial and tilting movement of the motor during operation and shipping. To achieve these ends, mounting arrangements have been developed comprising mounting arms which have low torsional spring constants, and yet have sufficient strength to withstand shipping and handling loads for the motor and blower assemblies. The spring constants of the mounting arms for the axial, radial and tilting vibration modes are selected so that the characteristic vibration transmissibility ratios for these modes are close to unity. However, the characteristic torsional mode of vibration transmissibility is substantially less than unity because of the flexibility of the arms. Such prior art mounting arrangements are disclosed in Litch U.S. Pat. No. 4,063,060 and Dochterman U.S. Pat. No. 4,076,197 which are owned by the assignee of the present application. The entire disclosures of those two patents are also incorporated herein by reference.

In many instances, it is desirable to permanently attach the mounting arms to the motor shell when manufacturing original equipment motors. For replacement or aftermarket motors, however, motors are sometimes mounted by means of bolts, welding straps, or bands removably affixed to the shell. This sometimes is thought to afford more flexibility in handling replacement motors.

One prior art arrangement for mounting motors, particularly replacement motors, to blower housings or other mounting structures comprises a belly band which encircles the motor shell and is tightly secured thereto by means of a band tightener. One example of this type of mounting arrangement is disclosed in Litch U.S. Pat. No. 4,063,060.

The bolt holes on the blower housing, to which the mounting arms or lugs are secured, are generally arranged in a circular pattern along the curved scroll which defines the air inlet at one side of the housing. Accordingly, in order for the motor to be properly installed on the blower housing, the corresponding bolt holes on the mounting arms must match up with the bolt holes on the housing. Motor mounting adaptor kits of the belly band type discussed above have been used in the industry, but these kits generally are suitable only for a particular motor diameter and a particular bolt hole spacing and circumference. Thus, a large inventory of such mounting kits is required to accommodate the wide variety of motor sizes and bolt hole spacings and circumferences which may be encountered.

The belly band type of mounting kits that utilize radiator hose clamp types of bands partially overcome some of the disadvantages of non-universal kits by providing a band which is infinitely adjustable by virtue of a screw-type band tightener. The mounting arms, however, can be positioned at any point around the circumference of the band. This might require the installer to rough position the mounting arms on the band, partially tighten the band, place the motor and mounting structure into the blower inlet to determine whether or not the openings in the arms coincide with the bolt hole openings, perhaps readjust the position of the arms, and then make a further visual determination as to whether or not they match up. This procedure could be unwieldly, and require additional time to obtain a proper fit between the mounting structure and bolt holes.

It is an object of the present invention to provide a motor mounting arrangement of the band and mounting arm type wherein the mounting arrangement is suitable for use with different motor shell diameters and bolt hole circumferences and spacings.

It is a further object of the present invention to provide such a motor mounting arrangement wherein the mounting arms can be quickly located and positively locked at the proper circumferential positions on the band for a plurality of band circumferences, thereby insuring proper alignment between the bolt holes in the mounting arms and the bolt holes in the blower housing.

A still further object of the present invention is to provide a motor mounting arrangement which is quickly and easily installed onto a replacement motor, and yet provides the torsional, axial, tilting and radial vibrational and shock characteristics provided by the mounting arrangements disclosed in the aforementioned U.S. Pat. Nos. 4,063,060 and 4,076,197.

SUMMARY OF THE INVENTION

In carrying out the above and other objects of the invention in one preferred form thereof, I provide a mounting scheme of the belly band type wherein the mounting arms are easily positioned at the proper angular spacing for a plurality of motor shell diameters. Although a mounting scheme could have been used wherein the mounting arms are permanently secured to the band at a proper angular spacing (for example, a spacing of 120°), such a mounting scheme would be suitable only for a given diameter of motor. If the same mounting structure then were secured to a motor having a shell diameter which was larger or smaller than that for which the structure was specifically manufactured, the mounting arms would no longer have the required angular spacing. For example, if the band were tightened around a motor shell having a larger diameter than that prescribed, the angular spacing between two of the arms would increase, and the angular spacing between these two arms and the third arm would decrease. The converse would be true for smaller than prescribed motor shell diameters, wherein the angular spacing between two of the arms would decrease and between these two and the third arm would increase. In this situation, the holes in the mounting arms would no longer be aligned with the bolt holes in the blower housing.

A mounting approach embodying the present invention includes a band having locating means thereon which permit the mounting arms to be properly located at predetermined preferred angular spacings for a plurality of (for example, at least two) different band circumferential sizes. In the most preferred forms, such spacing would be uniformly 120 degrees regardless of motor diameter size. However, the present invention may also be utilized where it might be desired to mount a motor of one size with arms spaced uniformly therearound at 120° intervals, and to mount a motor of another size with arms spaced therearound at other than 120° intervals. Also in more preferred forms, it is not necessary for the installer to position the arms by a trial and error method, because locating means which are provided will permit arms to be quickly and easily located in their proper desired predetermined angular positions prior to tightening the band around the shell of a motor.

The proper sizing of the mounting structure in preferred embodiments of my invention is accomplished by selecting a band extension element of the proper length, or by omitting the band extension element altogether, depending on the motor diameter in question. The mounting structure is preferably furnished in the form of a kit comprising the band, three or more mounting arms or lugs, and one or more band extension elements of the proper length or lengths. If two such extension elements are provided, then the kit will be suitable for installing motors of three respective diameters, the smallest diameter motor requiring no extension element, the next larger motor requiring the addition of the smaller extension element, and the largest motor requiring the largest extension element. Three sets of openings or other locating means on the band will be provided in this event so that, for the three band circumferences in question, the mounting arms will be located at the desired predetermined angular positions. Of course, depending on the required angular spacing of the arms and their respective band assembly sizes, certain ones of the openings may be common to more than one set of openings.

A preferred mounting assembly or arrangement embodying the present invention comprises a flexible band capable of assuming a generally circular shape and having an inner circumferential surface, a plurality of mounting arms interfitting with the band such that an end portion of each of the arms is disposed against the inner circumferential surface of the band, and wherein the arms are located at predetermined circumferential locations on the band. Each of the arms includes locating means, and there are provided a plurality of locating means on the band capable of interfitting with the locating means on the arms for locating the arms on the band in various circumferential positions. A first set of the locating means on the band have a first predetermined angular spacing when the band is disposed in a circular shape having a first circumferential size, and a second set of the locating means on the band also have predetermined angular spacings when the band is disposed in a circular shape having a substantially different circumferential size than the first circumferential size. If desired, the angular spacing may be the same for each final size, whereby the arms can be positioned at the same angular locations regardless of the final circumferential size of the band.

Preferably, each of the arms includes a slot within which the band is slidably disposed. The locating means on the band preferably comprise a plurality of openings, and the locating means on each of the arms then preferably comprise tabs on the end portions thereof which are capable of interfitting with the openings. However, the locating means may be in many other specific forms. For example, the band may be embossed or formed with other surface irregularities other than holes, and complimentary surface irregularities on the arms would then be used to interfit with the band and establish fixed predetermined locations for the arms on the band. The mounting assemblies include an extension element, which is connectable between the ends of the basic band elements so as to form bands of larger circumferential size. When the locating means are in the form of openings or holes in the band, the first set of openings are positioned such that they will be in the desired predetermined angular positions when the extension is not used and the ends of the basic band element are secured together, and the openings of the second set are positioned such that they will be at the desired predetermined angular positions when the band extension is utilized.

The subject matter which I regard as my invention is set forth in the appended claims. The invention itself, however, together with further objects and advantages thereof, may be better understood by referring to the following more detailed description taken in conjunction with the drawings.

BRIEF DESCRIPTION OF THE DRAWINGS

FIG. 1 is an isometric view of a band usable in practicing the present invention in one form thereof;

FIG. 2 is an elevational view, partially in section, of a motor mounting assembly embodying the present invention installed on a motor wherein three mounting arms have been located on the band of FIG. 1;

FIG. 3 is an elevational view of the assembly of FIG. 2 but with the extension element removed;

FIG. 4 is a plan view of a blank from which mounting arms shown in FIGS. 2 and 3 are made;

FIG. 5 is a view similar to FIG. 4 but wherein the housing and motor end portions have been bent to shape;

FIG. 6 is a bottom view of the arm shown in FIG. 5;

FIG. 7 is a fragmentary side elevational view of the motor end portion of the arm of FIG. 6;

FIG. 8 is a fragmentary edge view of the motor end portion of the arm of FIG. 7; and FIG. 9 is a reduced isometric view showing the mounting assembly secured to a electric motor.

DESCRIPTION OF THE PREFERRED EMBODIMENTS

Referring now to the drawings, FIGS. 2 and 9 illustrate a mounting assembly 10, embodying the present invention in one form thereof, secured around a fractional horsepower motor 12. The mounting assembly comprises a flexible steel band member 14 (FIG. 1) made of common cold rolled steel having a thickness of 0.050 in. and a width of approximately 0.50 in. As best seen in FIG. 3, band 14 includes upturned ends 16 and 18 having openings therein to accommodate bolt 20. As illustrated in FIG. 3, the ends 16 and 18 of band 14 are secured together by bolt 20, which passes through the aforementioned apertures, and is secured thereto by nutt 22. In the configuration illustrated in FIG. 3, the circumference of band 14 is such that it is capable of tightly encircling a motor having a given shell diameter, for example, a diameter of about 4.9 or 5.0 in.

When the band is configured as shown in FIGS. 1, 2 and 9, on the other hand, it has a circumference which is larger than that shown in FIG. 3, and is dimensioned such that it would tightly encircle a motor shell of larger diameter, for example, 5.50 in. This is accomplished by connecting an extension element 24 generally between the ends 18 and 16 of band element 14. Extension element 24 is an arcuate strip of the same steel material of which band 14 is made, having a curvature conforming generally to the curvature of the motor shell with which it is intended to be used. Thus, in the case of a 5.50 in. diameter motor, the radius of element 24 would be approximately 2.75 in. Band element 14 is also preferably arcuate in shape, having a radius approximately the same as that of strip 24. Of course, since band element 14 is relatively flexible and formable, it can be easily expanded or contracted to fit different sizes of motors and thus assume different curvatures. Thus, the same band 14 conforms to a smaller circumference illustrated in FIG. 3, and also to a larger circumference as shown in FIGS. 1 and 2.

Extension element 24 includes a pair of hooks 26 punched radially outwardly therefrom, and these hooks 26 engage correspondingly dimensioned openings 28 in band element 14, as illustrated in FIGS. 1 and 2. Extension element 24 also includes an upturned end 30, which is dimensioned similarly to ends 16 and 18 of band element 14, and includes an opening through which bolt 20 can extend. Extension element 24 is secured to band 14 by hooking elements 26 in openings 28, and then drawing end portions 30 and 16 together by means of bolt 20 and nut 22.

Three identical mounting arms 32 are shown connected to the band assembly comprising band 14 and extension element 24 in FIG. 2, and to band 14 alone in FIG. 3. Mounting arms 32 are generally of the type disclosed in the aforementioned U.S. Pat. Nos. 4,076,197 and 4,073,060, which provide for axial, radial and tilting mode vibrational stability or rigidity, and yet sufficient torsional flexibility to isolate torsional motor vibrations from the structure to which the arms 32 are to be mounted.

FIGS. 4–8 illustrate the development and structure of arms 32. Initially, a blank (FIG. 4) made of martensitic steel, as referred to in the above referenced patents, is stamped out, and it will be seen that this blank comprises a pair of blower or bulkhead bolt holes 34a and 34b on the blower or bulkhead end 36 of the blank, an elongated slot 38 adjacent the motor end portion 40 of the blank and slits 60–63. This blank is then deformed to form the shape shown in FIG. 5 wherein the motor end portion 40 is bent perpendicular to the intermediate portion 42, a locating tab 44 is bent upwardly relative to end portion 40, and a pair of edge tabs 46 are bent upwardly from portion 40. Tabs 44 and 46 are bent upwardly from end portion 40 as best shown in FIGS. 7 and 8. It will be appreciated that the bend between end portion 40 and intermediate portion 42 coincides with slot 38.

Band 14 includes a plurality of openings 48, 50, 52, 54 and 56 which extend completely therethrough, and are positioned at very accurately predetermined circumferential locations around band 14. Mounting arms 32 are interfitted with band 14 by inserting one of the ends 16 or 18 of band 14 into the respective slots 38 of arms 32, and the arms 32 can then be slid around band 14 to the desired positions. Side tabs 46 are separated by a distance which is slightly greater than the width of band 14, and they serve to both guide arms 32 as they are moved into position and prevent arms 32 from twisting on band 14 about respective radial axes when the assembly 10 is installed on motor 12.

Arms 32 are located on band 14 at predetermined angular locations by causing tabs 44 to enter respective selective openings 48, 50, 52, 54 and 56. When the mounting assembly 10 is slipped over the shell of motor 12 of FIG. 2, and band 14 and extension element 24 are tightened by tightening bolt 20, the motor end portions 40 of the arms 32 will be tightly clamped between the outer surface 58 of the motor 12 and the inner circumferential surface 60 of band 14 as illustrated in FIG. 2.

Assume that the blower housing (not shown), for which the mounting assembly 10 shown herein is particularly designed, has three bolt holes which are spaced 120° apart. If motor 12 has an outer diameter of 5.50 in., then it will be necessary to use extension element 24. Arms 32 are first slipped over band 14, extension element 24 is connected to band 14 in the manner described above, and the ends 30 and 16 are connected together by bolt 20 and nut 22. Arms 32 are then positioned such that their respective tabs 44 engage a first set of openings 48, 52 and 56 which, for the approximately 5.50 in. diameter of the band assembly including extension element 24, will be located at positions 120° apart and their bolt holes 34a or 34b will align with the bolt holes on the blower housing. Mounting assembly 10 is then slipped over motor 12, and bolt 20 and nut 22 are tightened so as to tightly draw band 14 and extension element 24 around motor 12. Since the bolt holes 34a or 34b on the mounting assembly 10 and those on the blower housing will then be properly aligned, motor 12 and mounting assembly 10 can be mounted in place without the need for further adjustment or repositioning of arms 32.

If, however, a smaller diameter motor, such as one having a shell diameter of only 5.0 in., is to be installed, extension element 24 will not be needed and the ends 16 and 18 of band 14 can be secured directly together as shown in FIG. 3. Since band 14 will have a smaller circumference, arms 32 must be repositioned such that they will again be disposed at predetermined angular spacings which, for the structure shown in FIG. 3, is 120°. To accomplish this, arms 32 are positioned such that their respective tabs 44 are received in openings 50, 54 and 56, which make up the second set of openings on band 14. When band 14 is tightened around the five inch diameter motor, openings 50, 54 and 56 will be angularly spaced by 120°, so that the smaller diameter motor can also be mounted using the same mounting assembly 10, but without extension 24. Mounting holes 34a or 34b may then be used, depending on the mounting bolt hole circle size in the blower. It will be understood that lugs or arms 42 typically are designed for use either with a 5.0 or 5.5 inch motor so that the holes 34a will match, for example, a 10 inch bolt circle and the holes 34b will match a 9 inch bolt circle for a given motor size. Thus, in actual practice, the arms 42 to be used for the two different motor sizes will be dimensioned slightly differently from one another when it is desired to match both 9 and 10 inch bolt hole circles with both sizes of motors. In other words, arms of one dimension will be used for 5.0 inch motors, and arms of different dimensions will be used for 5.5 inch motors. Alternatively, arms 42 may be so dimensioned and holes 34a, 34b may be so spaced that they will match, for example, the same bolt circle (e.g., nine inches) for two different motor sizes. For example, if this is to be done for 5.0 and 5.5 inch motors, the holes 34a, 34b would be spaced apart one-quarter of an inch as viewed in FIG. 3. Then one set of arms could be used to mount either motor size in a given mounting circle.

The positions and angular spacings of openings 48, 50, 52, 54 and 56 will depend on the particular range of motor diameters and mounting bolt hole angular spacings for which a given kit is designed. For example, the desired angular spacing for arms 42 could be 90°, 90° and 180°, rather than the uniform 120° spacing discussed above. When it is desired to have a uniform 120° arm spacing for both motor diameters (5 and 5.5 inches), when band 14 is contracted to fit a five inch motor such that openings 50, 54 and 56 are angularly spaced by 120°; opening 52 will be spaced from opening 48 and from opening 56 by approximately 138° while the band is contracted to 5.0 inches, so that openings 52, 48, and 56 will be mutually spaced at 120° when the band is expanded to fit a 5.5 inch motor.

Of course, more than one extension member 24 also could be provided so that more than two motor diameters could be accommodated by the mounting kit. In this case, two additional openings similar to openings 48–56 would be provided on band 14 and located at predetermined positions such that, when the band 14 is expanded or contracted to the circumference necessary to accommodate the second extension member, the additional openings together with opening 56 would have the predetermined desired angular spacing. As a further alternative, the kit could include only a singe extension element 24, but additional openings, such as openings 28 (see FIG. 1), would be provided in band 14 so that extension element 24 would have two alternative positions relative to band 14. In this case, two separate sets of arm locating openings, such as openings 48–56, would be provided for the two positions of extension element 24 and still another set of arm locating openings would be provided for use when no extension element was used at all.

It will be appreciated that, in the embodiment illustrated, opening 56 is a part of both the first and second set of openings. Depending on the relationship between the alternative circumferences of the mounting assembly and the required spacing of arms 32, it is conceivable that two of the openings could be part of more than one set of openings. If desired, indicia (not shown) could be provided on band 14 adjacent the openings 48–56 to quickly identify which openings are to be used for a given motor diameter. Alternatively, the openings 48, 50, etc. could be made of different shapes to indicate which openings are to be used for a given set. Thus, openings 48 and 52 could be elongated slots, diamond shaped, etc., while holes 50, 54 and 56 could be round holes.

While I have shown and described preferred and alternative embodiments of the invention and methods of making and using the same, the disclosure should be construed as being exemplary in nature, and the invention itself, therefore, should be limited only by the scope of the claims that are appended hereto and that form part of my disclosure.

What I claim as new and desire to secure by Letters Patent of the United States is:

1. A mounting assembly for a motor comprising:
   a flexible band capable of assuming a generally circular shape and having an inner circumferential surface,
   a plurality of mounting arms interfitting with said band such that an end portion of each of the arms is disposed against the inner circumferential surface of the band and wherein the arms are circumferentially adjustable on said band,
   locating means on each of said arms, and
   locating means on said band capable of interfitting with the locating means on said arms for locating the arms on said band in various predetermined circumferential positions,
   a first set of said locating means on said band having a first predetermined angular spacing when said band is disposed in a circular shaped having a first circumferential size and a second set of said locating means on the band having the same predetermined angular spacing when said band is disposed in a circular shape having a second circumferential size different than the first circumferential size, whereby said arms can be positioned at the same angular spacings for both circumferential sizes of said band.

2. The mounting assembly of claim 1 wherein each of said arms includes a slot within which said band is slidably disposed, each of said locating means on said band comprises an opening, and said locating means on each of said arms comprises a tab on the end portion thereof which is capable of interfitting with said openings.

3. The mounting assembly of claim 2 wherein the end portion of each of said arms includes an edge which is radially inwardly adjacent to the inner circumferential surface of said band, and said tab is formed as a notch in said edge.

4. The mounting assembly of claim 2 wherein said band has edges on opposite sides of said inner circumferential surface, and each of said arms includes tabs disposed adjacent to the end portion in engagement with the band inner surface and axially adjacent the edges of said band.

5. The mounting assembly of claim 1 wherein said band has edges on opposite sides of said inner circumferential surface, and includes means on said arms for engaging said band edges to prevent twisting of said arms, on said band about respective radial axes.

6. The mounting assembly of claim 1, further including an extension member connectable between opposite ends of the band to enlarge the circumferential size of said band.

7. The mounting assembly of claim 1 wherein said band is tightly wrapped around a motor shell and said arm end portions are clamped between the motor shell and the inner circumferential surface of the band.

8. A mounting assembly for a motor comprising:
a flexible band assembly comprising a first member having ends, an extension member, the ends of said first member being selectively connectable either directly together to form a circular band of a first circumferential size or to the ends of the extension member so as to form a band of larger circumferential size,
a plurality of mounting arms interfitting with said band assembly and being circumferentially movable on said band assembly,
locating means on each of said arms, and
a plurality of locating means on said band assembly capable of interfitting with the locating means on said arms for locating the arms in a plurality of preselected circumferential positions,
a first set of said locating means on said band assembly having a predetermined angular spacing when the extension member is connected bewteen the ends of said first member, and a second set of said locating means on said band assembly having the same predetermined angular spacing when the ends of said first member are directly connected together, whereby said arms can be positioned on said band with the same angular spacings regardless of whether the extension member is in place.

9. The mounting assembly of claim 8 wherein the band assembly is tightly wrapped around a motor shell, and the end portions of said arms are clamped between the motor shell and the band.

10. The mounting assembly of claim 8 wherein each of said arms includes a slot within which said band assembly is slidable disposed, and wherein said locating means on each of said arms comprises a tab, and each of the locating means on said band comprises an opening interfitting with one of the arm tabs.

11. The mounting assembly of claim 8 wherein the ends of the arms remote from the band each include at least two holes for use in mounting the assembly to a mounting surface.

* * * * *

UNITED STATES PATENT AND TRADEMARK OFFICE
CERTIFICATE OF CORRECTION

PATENT NO. : 4,323,217
DATED : April 6, 1982
INVENTOR(S) : Richard W. Dochterman It is certified that error appears in the above—identified patent and that said Letters Patent is hereby corrected as shown below:

Claim 10, line 19, "slidable" should be --slidably--.

Signed and Sealed this

Twenty-first Day of May 1985

[SEAL]

Attest:

DONALD J. QUIGG

Attesting Officer      Acting Commissioner of Patents and Trademarks